(12) United States Patent
Mashino

(10) Patent No.: US 7,687,967 B2
(45) Date of Patent: Mar. 30, 2010

(54) BRUSH ASSEMBLY FOR ALTERNATOR EASY TO INSTALL AND CAPABLE OF RELIABLY PREVENTING ENTRANCE OF FOREIGN MATTERS

(75) Inventor: Mikio Mashino, Kariya (JP)

(73) Assignee: Denso Corporation, Kariya (JP)

( * ) Notice: Subject to any disclaimer, the term of this patent is extended or adjusted under 35 U.S.C. 154(b) by 466 days.

(21) Appl. No.: 11/700,136

(22) Filed: Jan. 31, 2007

(65) Prior Publication Data

US 2007/0222328 A1   Sep. 27, 2007

(30) Foreign Application Priority Data

Feb. 7, 2006   (JP)   .............. 2006-030347

(51) Int. Cl.
*H02K 13/00*   (2006.01)

(52) U.S. Cl. ...................... 310/239; 310/240

(58) Field of Classification Search ............... 310/239, 310/232, 240–245, 88
See application file for complete search history.

(56) References Cited

U.S. PATENT DOCUMENTS

| | | | | | |
|---|---|---|---|---|---|
| 4,341,967 | A | * | 7/1982 | Iwaki | ................. 310/88 |
| 5,550,418 | A | * | 8/1996 | Chung | ................. 310/239 |
| 6,294,856 | B1 | * | 9/2001 | Ishida et al. | ................. 310/232 |
| 6,486,584 | B2 | * | 11/2002 | Chang | ................. 310/239 |
| 6,710,499 | B2 | | 3/2004 | Tsuge | |
| 6,967,426 | B2 | * | 11/2005 | Tsuge et al. | ................. 310/239 |
| 7,394,179 | B2 | * | 7/2008 | Mashino | ................. 310/239 |
| 7,417,353 | B2 | * | 8/2008 | Wada et al. | ................. 310/239 |
| 2005/0280330 | A1 | | 12/2005 | Mashino | |

FOREIGN PATENT DOCUMENTS

JP   A 2002-359951   12/2002
JP   A 2006-6000   1/2006

* cited by examiner

*Primary Examiner*—Quyen Leung
*Assistant Examiner*—Eric Johnson
(74) *Attorney, Agent, or Firm*—Oliff & Berridge, PLC

(57) ABSTRACT

A brush assembly for an alternator includes a brush, a brush holder holing the brush, and a slip ring cover for covering a slip ring on a rotary shaft of the alternator. The brush holder and the slip ring cover respectively have first and second through-holes that can be brought into alignment with each other by application of a mechanical force. The alignment allows a retainer to be placed through both the first and second through-holes to retain the brush in the brush holder against the spring force of a spring, thereby permitting installation of the brush assembly onto the rotary shaft to be carried out without interference between the brush and the slip ring. The first and second through-holes are brought out of the alignment by removal of the mechanical force and the retainer, thereby blocking foreign matters from entering inside through both the first and second through-holes.

5 Claims, 7 Drawing Sheets

FRONT SIDE ← → REAR SIDE

BRUSH ASSEMBLY FOR ALTERNATOR EASY TO INSTALL AND CAPABLE OF RELIABLY PREVENTING ENTRANCE OF FOREIGN MATTERS

CROSS-REFERENCE TO RELATED APPLICATION

This application is based on and claims priority from Japanese Patent Application No. 2006-30347, filed on Feb. 7, 2006, the content of which is hereby incorporated by reference into this application.

BACKGROUND OF THE INVENTION

1. Technical Field of the Invention

The present invention relates generally to brush assemblies and alternators. More particularly, the invention relates to a brush assembly for use in an alternator, which can be easily installed to the alternator and can reliably prevent foreign matters from entering the inside thereof during operation of the alternator.

2. Description of the Related Art

In automotive alternators, it is required to prevent foreign matters, such as water and oil, from invading sliding contact portions between brushes and slip rings, thereby preventing abnormal abrasion of the brushes.

Moreover, in automotive alternators, it is also required to exhaust brush powders produced by sliding contacts between the brushes and the slip rings and to suppress temperature rises of the sliding contact portions due to frictional heat generated by the sliding contacts.

To meet the above requirements, Japanese Patent First Publication No. 2002-359951 discloses a brush assembly employed in an automotive alternator, which has a structure designed to introduce cooling air to the vicinity of the sliding contact portions between the brushes and the slip rings. The brush assembly includes a brush holder holding the brushes therein and a slip ring cover configured to cover the slip rings. The installation of the brush assembly to the alternator is performed with the brush holder and the slip ring cover assembled together.

More specifically, the brush holder includes therein springs configured to respectively press the brushes against the slip rings. To prevent the brushes pressed by the springs from interfering with the slip rings during the installation of the brush assembly onto a rotary shaft of the alternator, the brush holder and the slip ring cover are configured to respectively have first and second through-holes. In the installation, the brush holder and the slip ring cover are first assembled together, thereby bringing the first and second through-holes into alignment with each other. Then, a rod-like retainer is placed through both the first and second through-holes, thereby retaining the brushes in the brush holder against the spring forces of the springs. After that, with the brushes retained in the brush holder by the retainer, the brush assembly is installed to the rotary shaft of the alternator without causing interference between the brushes and the slip rings. After the installation, the retainer is removed from the brush assembly, leaving the first and second through-holes in alignment.

With the above configuration, it is easy to install the brush assembly onto the rotary shaft of the alternator.

However, during operation of the alternator, foreign matters may enter the inside of the brush assembly through the first and second through-holes that are in alignment, thus causing abnormal abrasion of the brushes.

SUMMARY OF THE INVENTION

The present invention has been made in view of the above-mentioned problems.

It is, therefore, a primary object of the present invention to provide a brush assembly for use in an alternator, which can be easily installed to the alternator and can reliably prevent foreign matters from entering the inside thereof during operation of the alternator.

According to the present invention, there is provided a brush assembly for use in an alternator, which includes a brush, a brush holder, and a slip ring cover.

The brush is configured to slidably contact with a slip ring provided on a rotary shaft of the alternator.

The brush holder holds the brush. The brush holder has a brush receiving portion receiving therein the brush, a spring configured to press the brush received in the receiving portion against the slip ring, and a first through-hole.

The slip ring cover is configured to cover the slip ring and has a second through-hole. The slip ring cover is assembled with the brush holder with the first and second through-holes out of alignment with each other.

The brush holder and the slip ring cover are so configured that:

the first and second through-holes are brought into alignment with each other by application of a mechanical force on either of the brush holder and the slip ring cover, the alignment allows a retainer to be placed through both the first and second through-holes to retain the brush in the receiving portion of the brush holder against spring force of the spring, thereby permitting installation of the brush assembly onto the rotary shaft of the alternator to be carried out without interference between the brush and the slip ring, and the first and second through-holes are brought out of the alignment by removal of the mechanical force and the retainer, thereby blocking foreign matters from entering inside of the brush assembly through both the first and second through-holes.

With the above configuration, the brush assembly can be easily installed to the alternator and can reliably prevent foreign matters from entering the inside thereof during operation of the alternator.

According to a further implementation of the invention, the slip ring cover has a locking portion for locking the brush holder and the slip ring cover together. The first and second through-holes are brought into alignment upon deformation of the locking portion of the slip ring cover by the application of the mechanical force and out of alignment upon recovery of the locking portion from the deformation by the removal of the mechanical force and the retainer.

The locking portion of the slip ring cover has elasticity and recovers from the deformation by relying on the elasticity.

The brush holder has a cover portion that is plate-shaped and has the first through-hole formed therethrough, and the slip ring cover has a wall portion that is plate-shaped and has the second through-hole formed therethrough. When the first and second through-holes are out of alignment, the first through-hole is blocked by the wall portion of the slip ring cover while the second through-hole is blocked by the cover portion of the brush holder.

The alternator is for use in an automobile.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1-12.

Figure 1:
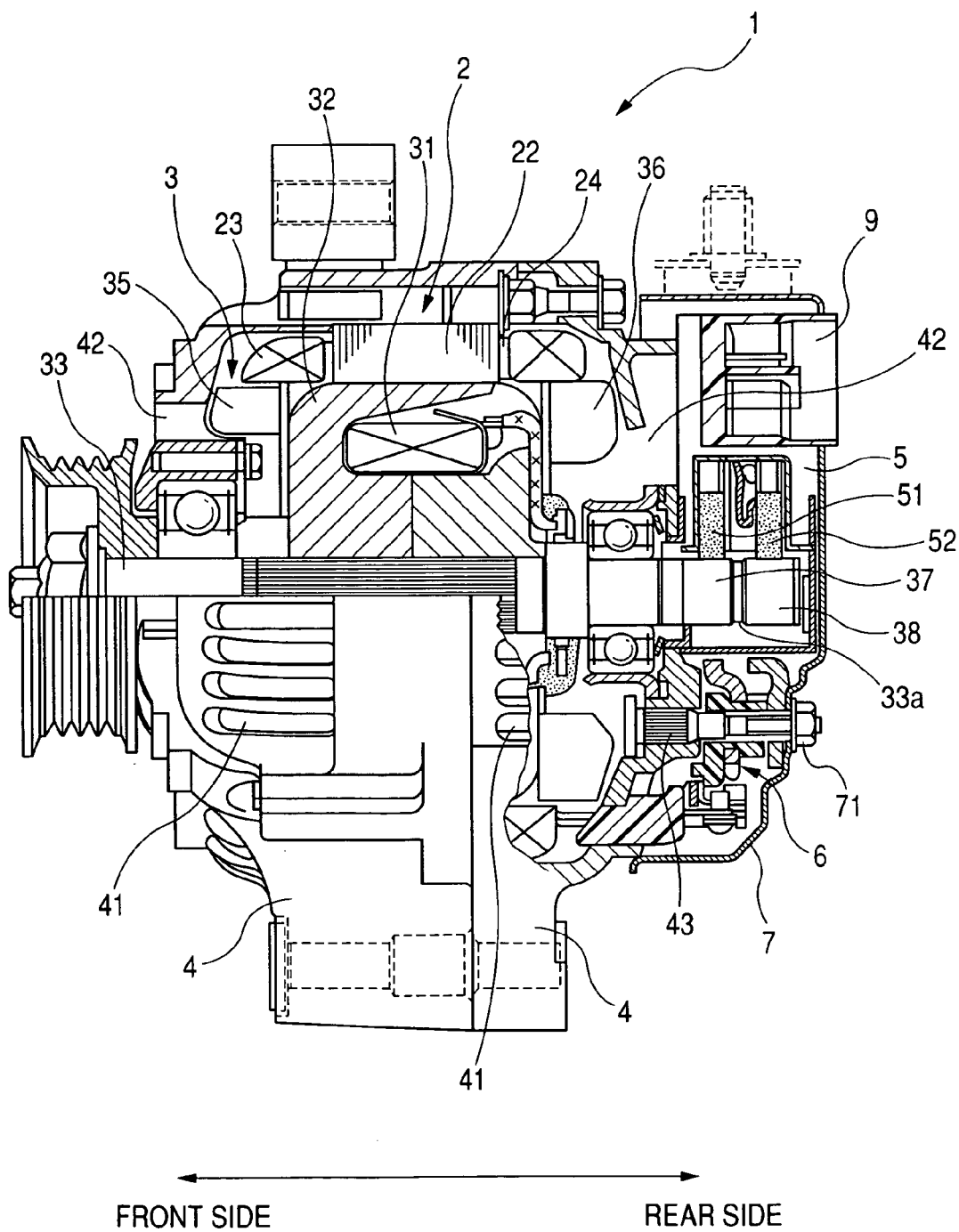
FIG. 1 is a partially cross-sectional view showing the overall configuration of an automotive alternator according to an embodiment of the invention.

FIG. 1 shows the overall configuration of an automotive alternator 1 according to an embodiment of the invention.

As shown in FIG. 1, the alternator 1 includes a stator 2, a rotor 3, front and rear frames 4, a brush assembly 5, a rectifier 6, a rear cover 7, and an IC regulator 9. The front and rear sides in the alternator 1 are also indicated in FIG. 1.

The stator 2 is configured with a stator core 22, a three-phase stator winding 23, and an insulator 24 that electrically insulates the stator core 22 from the stator winding 23.

The rotor 3 is configured with a field winding 31, front and rear pole cores 32, and a rotary shaft 33. The field winding 31 is formed by winding an insulated copper wire coaxially and cylindrically and is sandwiched between the two pole cores 32 in the axial direction with the rotary shaft 33 extending through the radial center thereof.

To the front end of the front pole core 32, there is mounted a cooling fan 35 by, for example, welding. The cooling fan 35 is configured to suck in cooling air from the front side and discharge it in both the axial and radial directions. On the other hand, to the rear end of the rear pole core 32, there is mounted a cooling fan 36 by, for example, welding. The cooling fan 36 is configured to suck in cooling air from the rear side and discharge it in the radial direction.

The rotary shaft 33 has a rear end portion 33a that protrudes out of the rear frame 4 and has a pair of slip rings 37 and 38 provided thereon. The slip rings 37 and 38 are electrically connected to the ends of the field winding 31, respectively, so that field current can be supplied to the field winding 31 via the brush assembly 5 and the slip rings 37 and 38 while the rotary shaft 33 is rotating.

The front and rear frames 4 together accommodate therein both the stator 2 and the rotor 3. More specifically, the rotor 3 is so supported in the frames 4 as to be rotatable about the rotary shaft 33. The stator 2 is so fixed in the frames 4 as to surround the rotor 3 with a predetermined annular gap therebetween. In addition, the frames 4 have a plurality of cooling air outlets 41, each of which is formed in alignment with the stator winding 23 in the radial direction, and a plurality of cooling air intakes 42 formed on the axial ends thereof.

The brush assembly 5 is provided to transmit field current from the rectifier 6 to the field winding 31 of the rotor 3. The brush assembly 5 includes brushes 51 and 52 that are configured to slidably contact with the slip rings 37 and 38, respectively. In the present embodiment, the brush assembly 5 is installed in the alternator 1 so that when the alternator 1 is mounted on an automobile, the brushes 51 and 52 protrude downward over the horizontal axis of the slip rings 37 and 38 to make sliding contact with them. The detailed configuration of the brush assembly 5 is to be described later.

The rectifier 6 works to rectify a three-phase AC power output from the three-phase stator winding 23 into a DC power.

The rear cover 7 is provided to cover the brush assembly 5, the rectifier 6, and the IC regulator 9, all of which are mounted to the outer surface of a rear end wall of the rear frame 4, thereby protecting them from foreign matters, such as water, oil, and dust. The rear cover 7 is fixed to the rear frame 4, by fastening a metallic nut 71 to a bolt 43 extending from the rear frame 4, with the rectifier 6 sandwiched therebetween.

The IC regulator 9 works to regulate an output voltage of the alternator 1 through controlling the field current supplied to the field winding 31.

Figure 2:
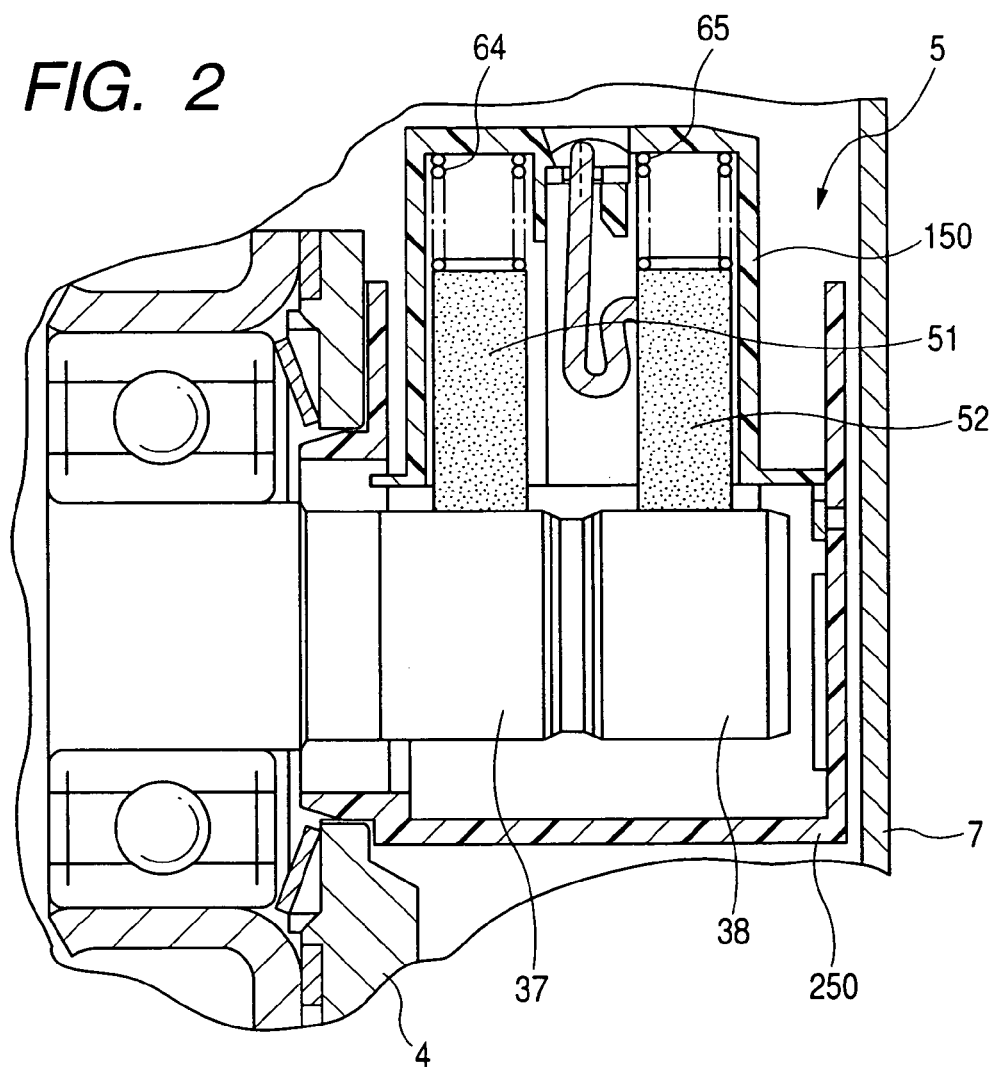
FIG. 2 is an enlarged partially cross-sectional view showing a brush assembly of the alternator.

Referring now to FIG. 2, the brush assembly 5 includes, in addition to the brushes 51 and 52, a brush holder 150 holding therein the brushes 51 and 52, and a slip ring cover 250 configured to cover the slip rings 37 and 38.

The brush holder 150 is made of a resin material and receives therein the brushes 51 and 52 and springs 64 and 65. The springs 64 and 65 are configured to respectively press the brushes 51 and 52 against the slip rings 37 and 38. In addition, the brush holder 150 has connection terminals embedded therein for making electrical connection between the rectifier 6 and the brushes 51 and 52.

Figure 3:
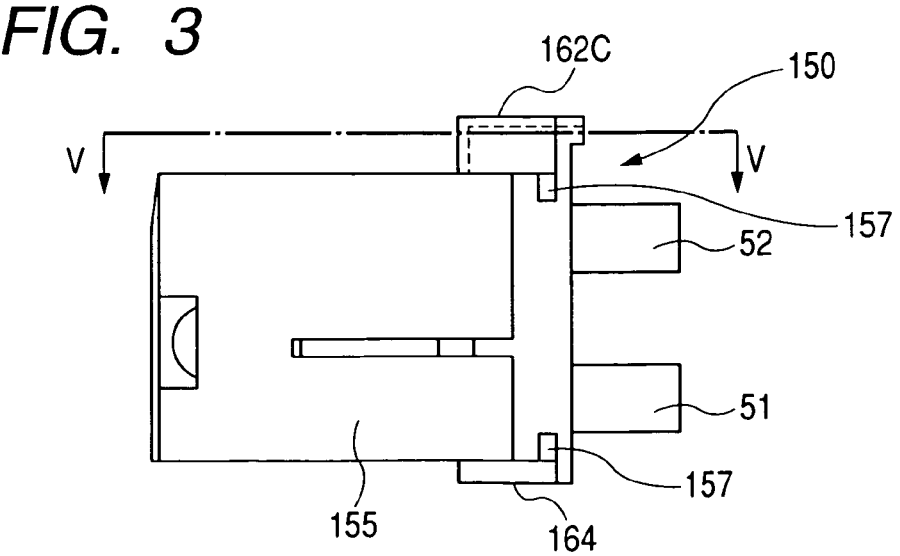
FIG. 3 is a side view of a brush holder of the brush assembly.
Figure 4:
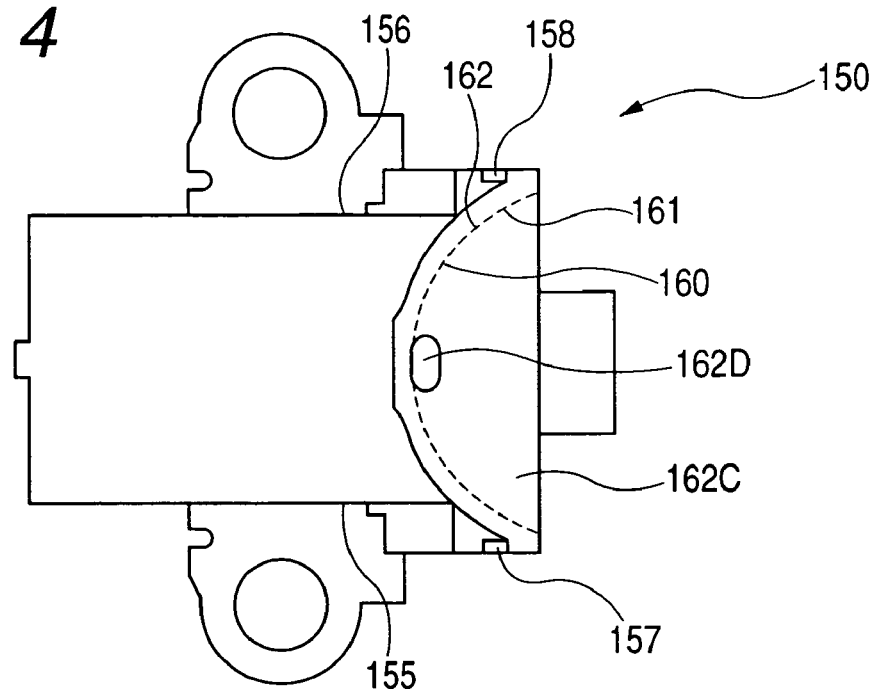
FIG. 4 is a rear end view of the brush holder.
Figure 5:
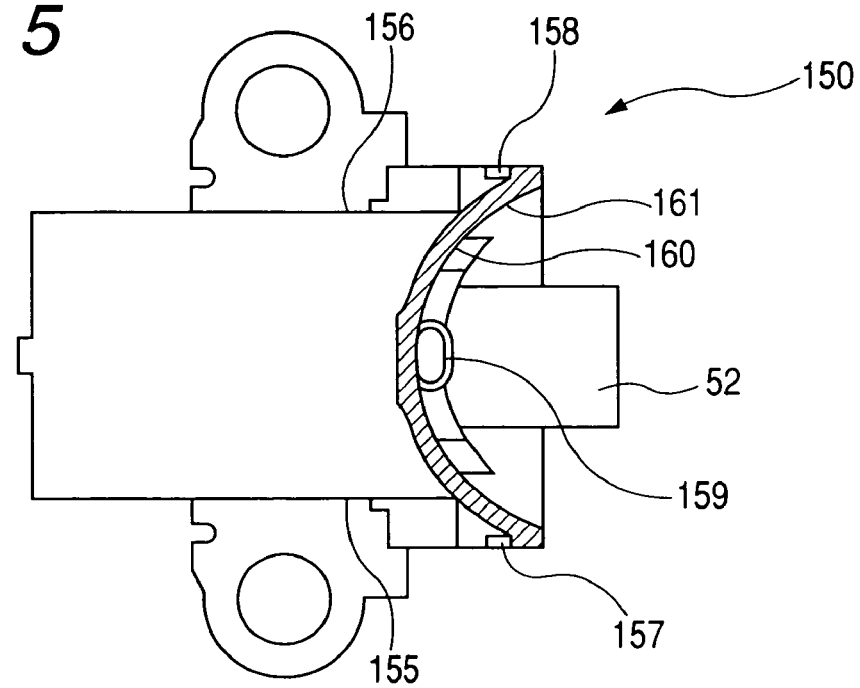
FIG. 5 is a cross-sectional view of the brush holder taken along the line V-V in FIG. 3.
Figure 6:
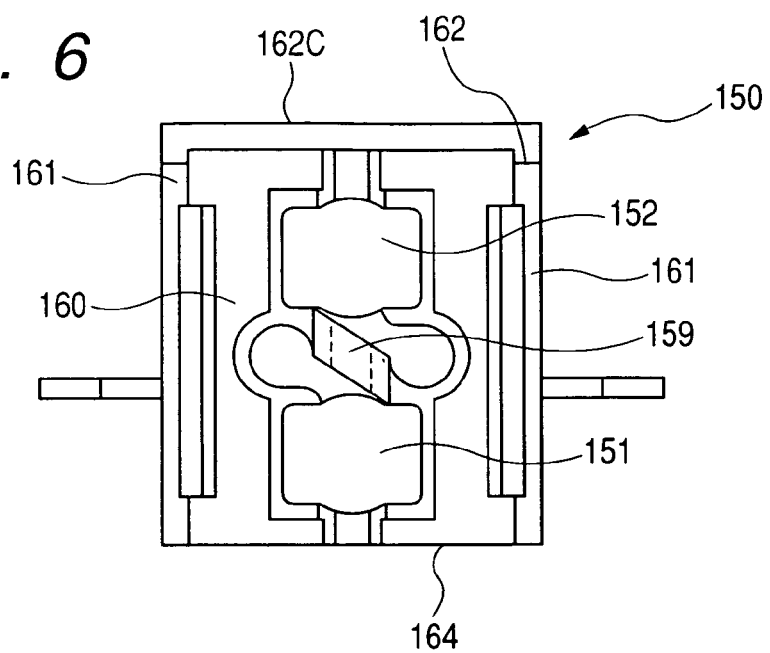
FIG. 6 is a bottom view of the brush holder.

FIGS. 3-5 show the brush holder 150 with the brushes 51 and 52 and springs 64 and 65 received therein; FIG. 6 shows only the brush holder 150. As shown in those figures, the brush holder 150 is substantially box-shaped.

The brush holder 150 has a facing portion 160, brush receiving portions 151 and 152, and a peripheral portion 161.

The facing portion 160 faces the slip rings 37 and 38. The brush receiving portions 151 and 152, which respectively receive therein the brushes 51 and 52, open on the facing portion 160. The peripheral portion 161 is integrally formed with the facing portion 160 around the facing portion 160. The facing portion 160 and the peripheral portion 161 together have an arc shape with a substantially constant radius from the axis of the rotary shaft 33 on a cross section perpendicular to the axial direction of the rotary shaft 33.

The brush holder 150 further has a cover portion 162C that has a plate shape and covers the rear end 162 of the periphery portion 161. The cover portion 162C has a through-hole 162D which is formed in close vicinity to the radial center of the rear end 162.

On one side of the brush holder 150, there are formed two recesses 157 away from each other by a predetermined distance in the axial direction of the rotary shaft 33. Similarly, on the other side, there are formed two recesses 158 away from each other by the predetermined distance in the axial direction. Moreover, in the facing portion 160, there is formed a through-hole 159 which extends between the brush receiving portions 151 and 152 in alignment with the through-hole 162 D.

Figure 7:
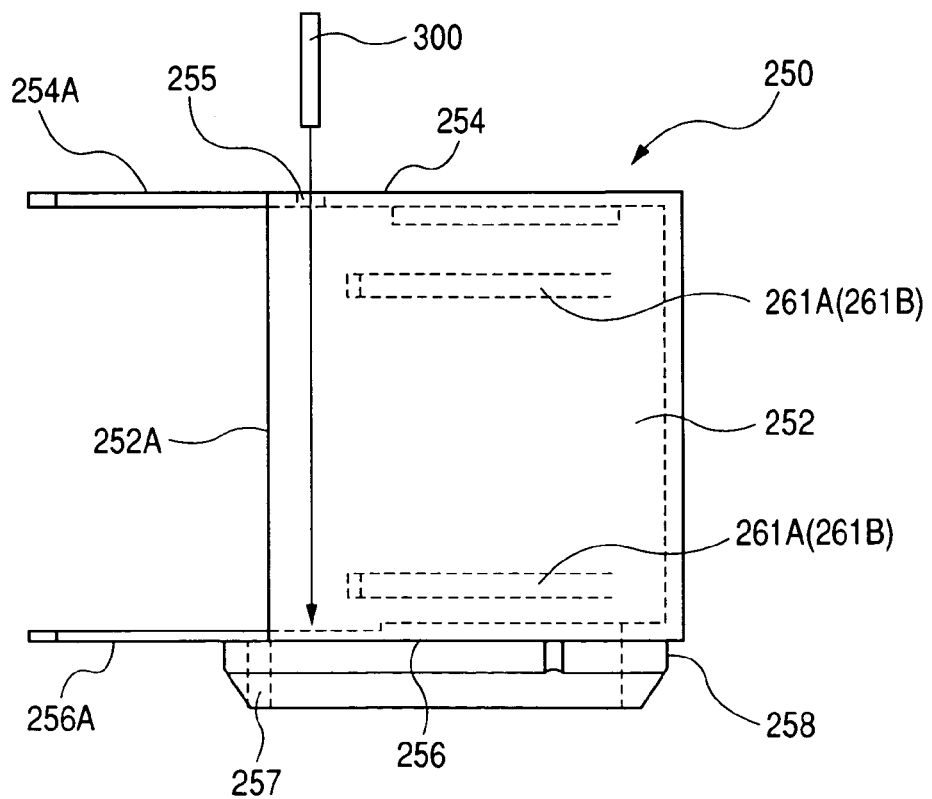
FIG. 7 is a side view of a slip ring cover of the brush assembly.
Figure 8:
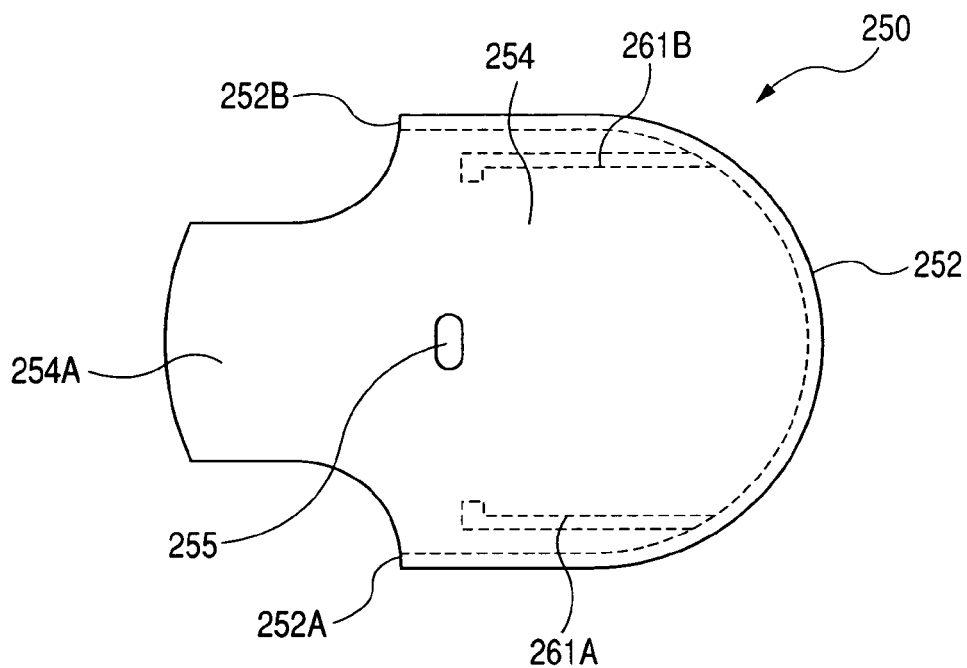
FIG. 8 is a rear end view of the slip ring cover.
Figure 9:
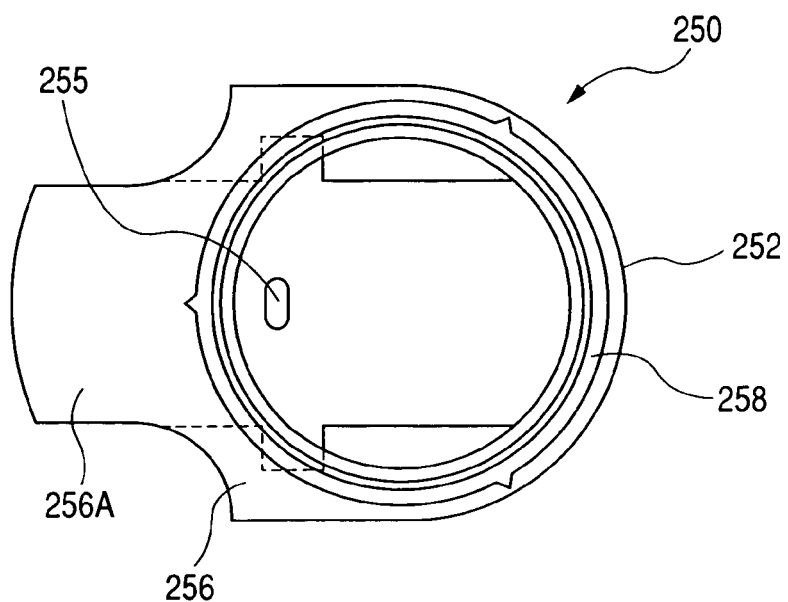
FIG. 9 is a front end view of the slip ring cover.

Referring to FIGS. 7-9, the slip ring cover 250 has a circumferential wall 252, a rear end wall 254, and a front end wall 256.

The circumferential wall 252 is so formed as to extend along the outer circumference of the slip rings 37 and 38 to cover them. The rear and front end walls 254 and 256 are plate-shaped and spaced from each other by a predetermined distance to cover the axial ends of the circumferential wall 252, respectively.

More specifically, the circumferential wall 252 has a U-shape in a cross section perpendicular to the axial direction of the rotary shaft 33 and extends in the circumferential direction of the rotary shaft 33 so as to have the circumferential ends 252A and 252B thereof respectively overlapping side walls 155 and 156 of the brush holder 150.

Figure 11:
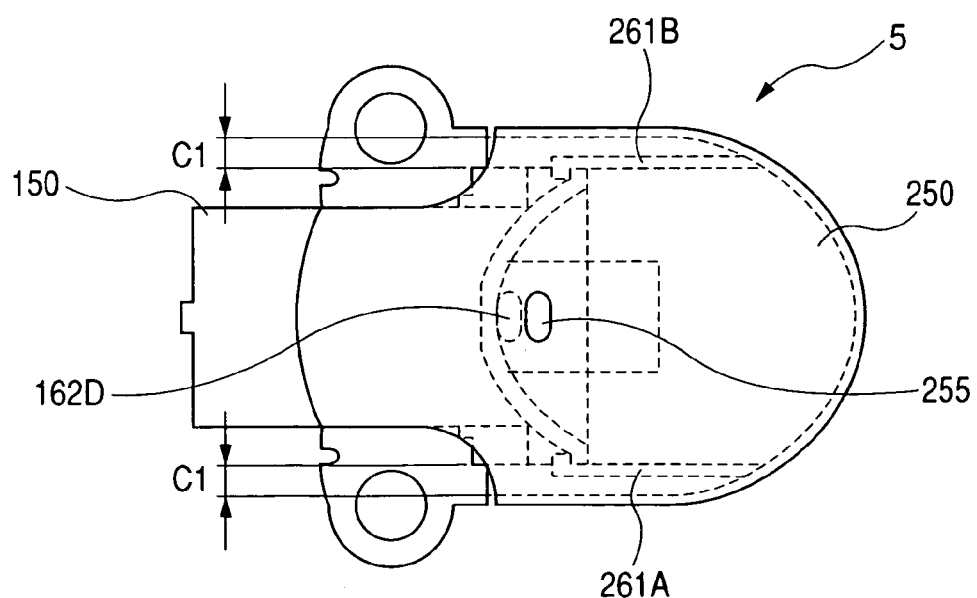
FIG. 11 is a rear end view showing the brush holder and the slip ring cover in assembled state.

In addition, in the present embodiment, the distance between the ends 252A and 252B of the circumferential wall 252 is set to be greater than that between the side walls 155 and 156, so that when the brush holder 150 and the slip ring cover 250 are assembled together, there are formed clearances C1 between the circumferential wall 252 of the slip ring cover 250 and the side walls 155 and 156 of the brush holder 150, as shown in FIG. 11.

The rear end wall 254 is so formed as to cover the entire rear end of the rotary shaft 33 and has a radial extension 254A that is adapted to the radial shape of the brush holder 150. Further, the rear end wall 254 has a through-hole 255 formed in the vicinity of the center thereof.

The front end wall 256 is formed around a shaft-entrance portion 258 that has a through-hole through which the rotary shaft 33 extends into the slip ring cover 250. The shaft-entrance portion 258 occupies most of the central area of the front end wall 256 and has the shape of a hollow cylinder protruding from the front end wall 256. The outer diameter of the shaft-entrance portion 258 is set to be almost equal to the inner diameter of a through-hole of the rear frame 4 through which the rotary shaft 33 protrudes out of the rear frame 4. Moreover, the front end wall 256 also has a radial extension 256A that is adapted to the radial shape of the brush holder 150.

The slip ring cover 250 further has formed therein locking portions 261A and 261B for locking the brush holder 150 and the slip ring cover 250 together.

More specifically, two locking portions 261A extend from the bottom surface of the U-shaped circumferential wall 252 in vicinity and parallel to one side of the circumferential wall 252 and spaced from each other in the axial direction of the rotary shaft 33. Similarly, two locking portions 261B extend from the bottom surface in vicinity and parallel to the other side and spaced from each other in the axial direction. The distances between the locking portions 261A and between the locking portions 261B in the axial direction are equal to those between the recesses 157 and between the recesses 158 of the brush holder 150 in the same direction. Further, the distance between each of the locking portions 261A and a corresponding one of the locking portions 261B is equal to that between each of the recesses 157 and a corresponding one of the recesses 158. Furthermore, each of the locking portions 261A and 261B has the distal end thereof bent at a right angle so as to have an L-shape.

Figure 10:
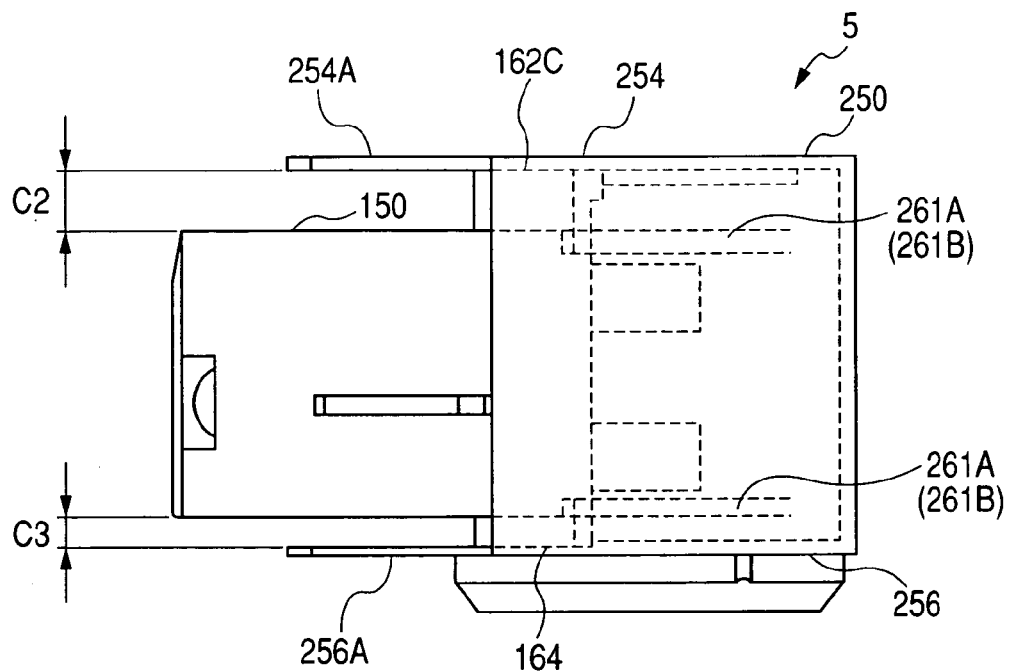
FIG. 10 is a side view showing the brush holder and the slip ring cover in assembled state.

FIGS. 10 and 11 show the brush holder 150 and the slip ring cover 250 in an assembled state. On the other hand, FIG. 12 illustrates the assembly of the brush holder 150 with the slip ring cover 250.

Figure 12:
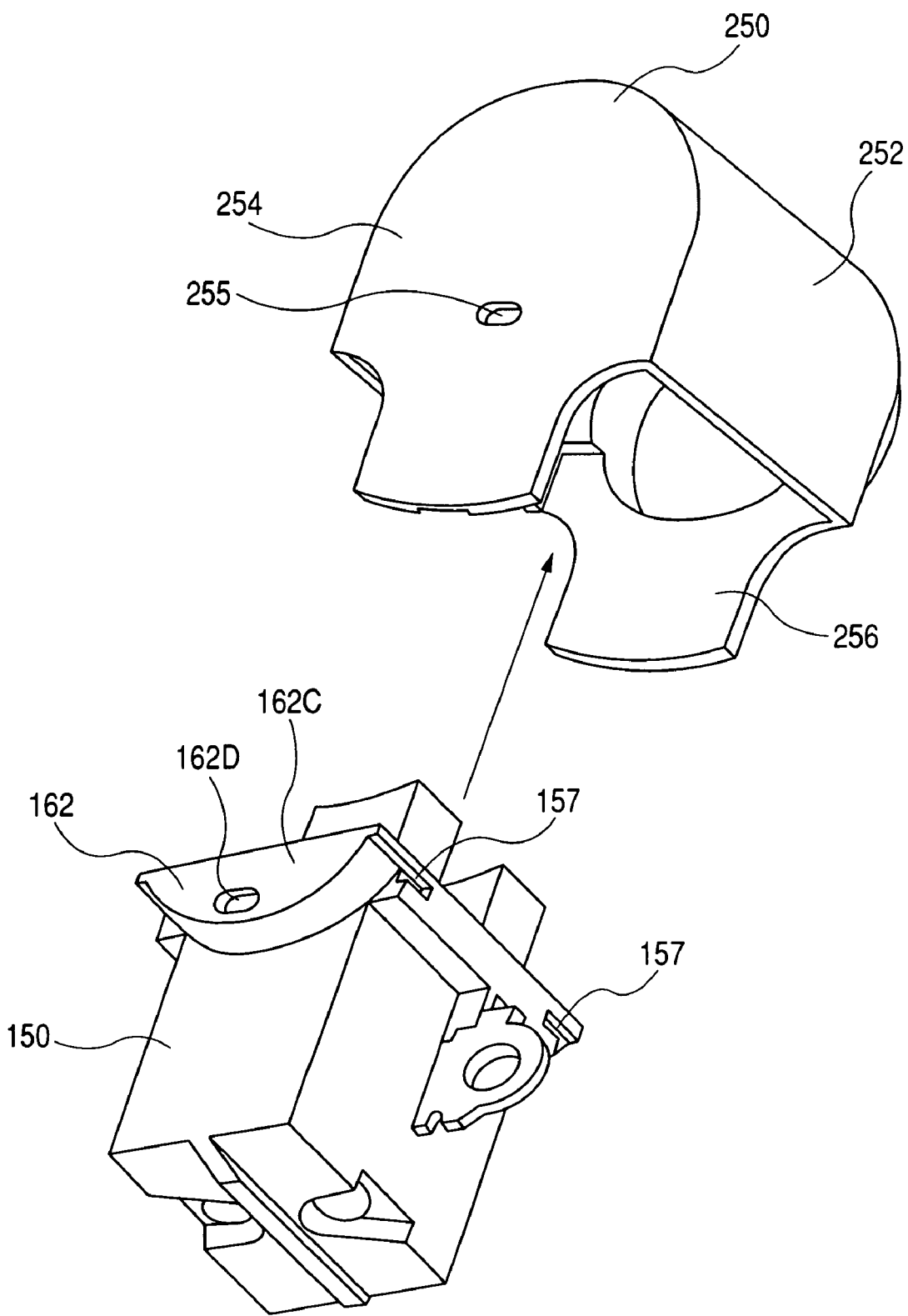
FIG. 12 is a perspective view illustrating assembly of the brush holder with the slip ring cover.

As shown in FIG. 12, in the assembly, the brush holder 150 is first inserted from the facing portion 160 into the opening of the slip ring cover 250 defined by the circumferential wall 252 and the rear and front end walls 254 and 256. Then, the distal ends of the locking portions 261A and 261B of the slip ring cover 250 are respectively fitted into the recesses 157 and 158 of the brush holder 150, thereby locking the brush holder 150 and the slip ring cover 250 together.

Consequently, the through-hole 162D formed in the cover portion 162C of the brush holder 150 is out of alignment with the through-hole 255 formed in the rear end wall 254 of the slip ring cover 250, as shown in FIG. 11. Moreover, as shown in FIG. 10, the rear and front end walls 254 and 256 of the slip ring cover 250 abut only the cover portion 162C and the front end 164 of the brush holder 150, respectively, forming clearances C2 and C3 between the extension 254A of the rear end wall 254 and the brush holder 150 and between the extension 256A of the front end wall 256 and the brush holder 150. The clearances C2 and C3 continue, along the circumference of the brush holder 150, to the clearances C1 between the circumferential wall 252 of the slip ring cover 250 and the side walls 155 and 156 of the brush holder 150.

After the assembly of the brush holder 150 with the slip ring cover 250 (i.e., after the completion of the brush assembly 5), a special tool is inserted into the brush assembly 5 through the through-hole of the shaft-entrance portion 258 of the slip ring cover 250 to press the brushes 51 and 52 respectively into the brush receiving portions 151 and 152 of the brush holder 150 against the spring forces of the springs 64 and 65. Then, a mechanical force is applied on the slip ring cover 250 to press it against the brush holder 150, thereby bringing the through-hole 255 of the slip ring cover 250 into alignment with the through-holes 162D and 159 of the brush holder 150. After that, a rod-like retainer 300 as shown in FIG. 7 is placed through the through-holes 255, 162D, and 159 that are in the alignment, and then both the mechanical force and the special tool are removed from the brush assembly 5. Consequently, the brushes 51 and 52 are retained in the brush receiving portions 151 and 152 of the brush holder 150 against the spring forces of the springs 64 and 65 by the retainer 300.

More specifically, in the present embodiment, the slip ring cover 250 is made of a flexible and elastic material, such as Nylon. Therefore, when the mechanical force is applied on the slip ring cover 250, the locking portions 261 and 262 of the slip ring cover 250 are elastically deformed to have a V-shape, thereby allowing the through-holes 255, 162D, and 159 to be brought into the alignment.

With the retainer 300 placed through the through-holes 255, 162D, and 159, the brush assembly 5 is installed onto the rear end portion 33a of the rotary shaft 33 of the alternator 1. Since the brushes 51 and 52 are retained in the brush receiving portions 151 and 152 of the brush holder 150 by the retainer 300, the installation can be carried out without interference between the brushes 51 and 52 and the slip rings 37 and 38.

After the installation, the retainer 300 is removed from the brush assembly 5, so that the locking portions 261A and 261B of the slip ring cover 250 recover from the deformation by relying on the elasticity thereof. The recovery brings the through-hole 255 of the slip ring cover 250 out of the alignment with the through-holes 162D and 159 of the brush holder 150, as shown in FIG. 11.

The above-described brush assembly 5 according to the present embodiment has the following advantages.

In the brush assembly 5, the brush holder 150 and the slip ring cover 250 are assembled together with the through-hole 162D of the brush holder 150 and the through-hole 255 of the slip ring cover 250 out of alignment with each other. However, upon application of a mechanical force on the slip ring cover 250, the through-hole 162D of the brush holder 150 and the through-hole 255 of the slip ring cover 250 can be brought into alignment with each other. The alignment allows the retainer 300 to be placed through both the through-hole 162D of the brush holder 150 and the through-hole 255 of the slip ring cover 250 to retain the brushes 51 and 52 in the brush receiving portions 151 and 152 of the brush holder 150 against the spring forces of the springs 64 and 65. With the thus retained brushes 51 and 52, it is possible to install the brush assembly 5 onto the rotary shaft 33 of the alternator 1 without interference between the brushes 51 and 52 and the slip rings 37 and 38 provided on the rotary shaft 33. After the installation, the through-hole 162D of the brush holder 150 and the through-hole 255 of the slip ring cover 250 are brought out of the alignment upon removal of the mechanical force and the retainer 300, thereby blocking foreign matters from entering the inside of the brush assembly 5 through both the through-holes 162D and 255.

In the brush assembly 5, the slip ring cover 250 has formed therein the locking portions 261A and 262B for locking the brush holder 150 and the slip ring cover 250 together. The locking portions 261A and 261B can be deformed by the application of the mechanical force on the slip ring cover 250, thereby bringing the through-hole 162D of the brush holder 150 and the through-hole 255 of the slip ring cover 250 into the alignment. Further, the locking portions 261A and 261B can recover from the deformation by the removal of the mechanical force and the retainer 300, thereby bringing the through-hole 162D of the brush holder 150 and the through-hole 255 of the slip ring cover 250 out of alignment. Thus, it is possible to change the relative position between the through-hole 162D of the brush holder 150 and the through-hole 255 of the slip ring cover 250 while keeping the brush holder 150 and the slip ring cover 250 locked together. Consequently, the brush assembly 5 can be easily handled as a single component during and before the installation thereof onto the rotary shaft 33 of the alternator 1.

In the brush assembly 5, the slip ring cover 250 is made of an elastic material. Thus, the locking portions 261A and 261B of the slip ring cover 250 can be elastically deformed to bring the through-hole 162D of the brush holder 150 and the through-hole 255 of the slip ring cover 250 into alignment and can recover from the deformation by relying on the elasticity thereof to bring the through-holes 162D and 255 out of alignment. Consequently, the brush assembly 5 can be returned to the original state only by removing the mechanical force and the retainer 300, thus simplifying the installation process.

In the brush assembly 5, the brush holder 150 has the plate-shaped cover portion 162C through which the through-hole 162D is formed, and the slip ring cover 250 has the plate-shaped rear end wall 254 through which the through-hole 255 is formed. When the through-holes 162D and 255 are out of alignment, the through-hole 162D of the brush holder 150 is blocked by the rear end wall 254 of the slip ring cover 250 while the through-hole 255 of the slip ring cover 250 is blocked by the cover portion 162C of the brush holder 150. Consequently, it is possible to reliably block foreign matters from entering the inside of the brush assembly 5 through both the through-holes 162D and 255.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the slip ring cover 250 is configured to have two locking portions 261A on one side and two locking portions 261B on the other side. However, the slip ring cover 250 may be configured to have different numbers of the locking portions 261A and 261B, for example four locking portions 261A and four locking portions 261B on the respective sides.

Moreover, though the brush assembly 5 is used in the automotive alternator 1 in the previous embodiment, it may be used in any other brushed alternators.

Such modifications, changes, and improvements within the skill of the art are intended to be covered by the appended claims.

What is claimed is:

1. A brush assembly for use in an alternator, the brush assembly comprising:
   a brush configured to slidably contact with a slip ring provided on a rotary shaft of the alternator;
   a brush holder holding the brush, the brush holder having a brush receiving portion receiving therein the brush, a spring configured to press the brush received in the receiving portion against the slip ring, and a first through-hole; and
   a slip ring cover configured to cover the slip ring and having a second through-hole, the slip ring cover being assembled with the brush holder with the first and second through-holes out of alignment with each other,
   wherein the brush holder and the slip ring cover are so configured that:
   the first and second through-holes are brought into alignment with each other by application of a mechanical force on either of the brush holder or the slip ring cover,
   the alignment allows a retainer to be placed through both the first and second through-holes to retain the brush in the receiving portion of the brush holder against spring force of the spring, thereby permitting installation of the brush assembly onto the rotary shaft of the alternator to be carried out without interference between the brush and the slip ring, and
   the first and second through-holes are brought out of the alignment by removal of the mechanical force and the retainer, thereby blocking foreign matters from entering inside of the brush assembly through both the first and second through-holes.

2. The brush assembly as set forth in claim 1, wherein the slip ring cover has a locking portion for locking the brush holder and the slip ring cover together, and
   wherein the first and second through-holes are brought into the alignment upon deformation of the locking portion of the slip ring cover by the application of the mechanical force and out of the alignment upon recovery of the locking portion from the deformation by the removal of the mechanical force and the retainer.

3. The brush assembly as set forth in claim 2, wherein the locking portion of the slip ring cover has elasticity and recovers from the deformation by relying on the elasticity.

4. The brush assembly as set forth in claim 1, wherein the brush holder has a cover portion that is plate-shaped and has the first through-hole formed therethrough, and the slip ring cover has a wall portion that is plate-shaped and has the second through-hole formed therethrough, and
   wherein when the first and second through-holes are out of the alignment, the first through-hole is blocked by the wall portion of the slip ring cover while the second through-hole is blocked by the cover portion of the brush holder.

5. The brush assembly as set forth in claim 1, wherein the alternator is an automobile alternator.

* * * * *